(12) United States Patent
Poshusta et al.

(10) Patent No.: US 10,099,925 B2
(45) Date of Patent: Oct. 16, 2018

(54) PROCESS FOR PRODUCING HYDROGEN BIS(FLUOROSULFONYL)IMIDE

(71) Applicant: ultra-Charge, Ltd., Haifa OT (IL)

(72) Inventors: Joseph Carl Poshusta, Broomfield, CO (US); Ryon Tracy, Westminster, CO (US)

(73) Assignee: Ultra-Charge, Ltd., Haifa (IL)

( * ) Notice: Subject to any disclaimer, the term of this patent is extended or adjusted under 35 U.S.C. 154(b) by 0 days.

(21) Appl. No.: 15/368,592

(22) Filed: Dec. 3, 2016

(65) Prior Publication Data

US 2017/0183230 A1    Jun. 29, 2017

Related U.S. Application Data

(60) Provisional application No. 62/263,505, filed on Dec. 4, 2015.

(51) Int. Cl.
    *C01B 21/093*    (2006.01)

(52) U.S. Cl.
    CPC .................................. *C01B 21/093* (2013.01)

(58) Field of Classification Search
    CPC .................................................... C01B 21/093
    See application file for complete search history.

(56) References Cited

U.S. PATENT DOCUMENTS 8,722,005 B1 *  5/2014  Poshusta ............. C01B 21/0935
                                                    423/386

FOREIGN PATENT DOCUMENTS

WO    WO-2016184176 A1 *  11/2016  ........... C01B 21/086

* cited by examiner

*Primary Examiner* — Anthony J Zimmer
(74) *Attorney, Agent, or Firm* — Don D. Cha; Hamilton DeSanctis & Cha, LLP

(57) ABSTRACT

The present invention provides a process for producing hydrogen bis(fluorosulfonyl)-imide (HFSI) by fluorination of a liquid hydrogen bis(chlorosulfonyl)imide (HCSI) using a gaseous hydrogen fluoride. In some embodiments, HFSI that is produced is separated from the reaction mixture as a gas and is condensed to collect a liquid HFSI.

24 Claims, 6 Drawing Sheets

PROCESS FOR PRODUCING HYDROGEN BIS(FLUOROSULFONYL)IMIDE

CROSS-REFERENCE TO RELATED APPLICATIONS

This application claims the priority benefit of U.S. Provisional Application No. 62/263,505, filed Dec. 4, 2015, which is incorporated herein by reference in its entirety.

STATEMENT REGARDING FEDERALLY FUNDED RESEARCH

This invention was made with government support under grant number DE-EE0007310 awarded by the Department of Energy. The government has certain rights in the invention.

FIELD OF THE INVENTION

This invention relates to a process for producing hydrogen bis(fluorosulfonyl)-imide (HFSI) by fluorination of hydrogen bis(chlorosulfonyl)imide (HCSI) using hydrogen fluoride.

BACKGROUND OF THE INVENTION

There are many processes for producing HFSI. However, none of the conventional processes are suitable for continuous production of HFSI. In many instances the conversion of HCSI to HFSI may be limited by equilibrium and that by selective removal of HCl the conversion could be shifted to the right. See, for example, a commonly assigned U.S. Pat. No. 8,722,005. However, typically a good conversion of HCSI to HFSI can be achieved using refluxing HF conditions and selective removal of HCl, which is not recovered in the condenser. While effective at achieving high conversion, this process requires a long reaction time and therefore a large reactor in commercial scale production. Large reactors for using hydrogen fluoride involve significant expense to ensure safe operation. Furthermore, the condenser that is used to recover HF from the HCl exhaust must operate a low temperature requiring refrigeration. Such refrigeration of the condenser adds to the overall cost of producing HFSI, thereby significantly limiting the commercial usefulness of this process.

Therefore, in order to achieve a significant commercial feasibility a process is needed that does not require a relatively long reaction time, a large reactor, and/or refrigeration of a condenser that is used in recovery of HF.

SUMMARY OF THE INVENTION

The process of the invention achieves a high conversion of HCSI to HFSI with anhydrous HF while overcoming some, if not all, of the limitations discussed above. This allows a significant commercial advantage for the present process relative to other conventional processes for producing HFSI. The process of the invention advantageously achieves high conversion in much shorter time than conventional processes and does not require a large reactor for a large scale production of HFSI.

In addition to lower capital cost for reactor hardware, the smaller reactor that can be used in the process of the invention is much safer to operate since the inventory or the amount of hot reacting material with hazardous HF is dramatically reduced. A further advantage of the present invention is that HFSI yield on an HF basis is high and requires no cold condenser to reflux HF. Thus, in larger scale production the expensive refrigeration system is not required.

One particular aspect of the invention provides a process for producing hydrogen bis(fluorosulfonyl)imide (HFSI). The process includes adding a liquid hydrogen bis(chlorosulfonyl)imide (HCSI) and a gaseous hydrogen fluoride to a reaction apparatus under conditions sufficient to produce HFSI. In some embodiments, HFSI is produced as a gas (e.g., vapor) and the process also includes removing the gaseous HFSI from the reaction apparatus; and condensing the separated gaseous HFSI to produce a liquid HFSI. In some embodiments, the reaction temperature and pressure conditions are maintained such that the combination of reaction temperature and pressure is below the vapor pressure of HFSI but above the vapor pressure of HCSI as show in FIG. 3.

In some embodiments, the process includes adding the liquid HCSI in a counter current manner relative to the gaseous hydrogen fluoride. The process can also include the step of separating HFSI that is produced from any hydrogen chloride byproduct.

Yet in other embodiments, the process can also include providing reaction conditions such that at least a portion of the HCSI is in the liquid phase, and the majority (i.e., more than 50%, typically at least 60% and often at least 75%) of the HFSI is in the vapor phase. This allows collection of HFSI as a gaseous product while maintaining HCSI in the reaction mixture.

Still in other embodiments, at least a portion of the unreacted HCSI is recovered. The recovered HCSI can be reintroduced to the reactor to increase the overall conversion yield. Typically, the process of the invention provides at least about 20% conversion, typically at least about 50% conversion, and often at least 80% conversion of HCSI to HFSI. It should be appreciated that as discussed herein any unreacted HCSI can be recovered and reused. In another embodiment, the process of the invention yields at least about 50%, typically at least about 70%, and often at least about 80% yield for HFSI based on the amount of HCSI used. It should be appreciated that these yields are a "single" pass reaction. One can increase the overall yield by recovering and recycling the unreacted HCSI to the same reaction.

Yet in other embodiments, the reaction apparatus can include a series of a plurality of reaction chambers. In such embodiments, each reaction chambers includes a reactor for producing HFSI from HCSI and hydrogen fluoride; and a HFSI condenser for collecting said gaseous HFSI produced from each reactor.

DETAILED DESCRIPTION OF THE INVENTION

The present invention provides a process for producing HFSI from HCSI using HF. The process of the invention can be summarized by the following reaction equation:

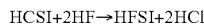

HCSI+2HF→HFSI+2HCl where HCSI is $HN(SO_2Cl)_2$ (i.e., hydrogen bis(chlorosulfonyl)imide), and HFSI is $HN(SO_2F)_2$ (i.e., hydrogen bis(fluorosulfonyl)imide).

Unlike conventional methods where the typical reaction is conducted at temperatures and pressures where HFSI is a liquid, processes of the invention are conducted at temperatures and pressures where HFSI that is produced is in a gas phase. In some embodiments, the majority of unreacted HCSI that is added to the reaction apparatus remains as a liquid under the reaction conditions. Some of the advantages of processes of the invention include, but are not limited to, a significantly higher productivity (kg/hr/l) or yield and higher conversion rates without product degradation. Furthermore, removal of HFSI as vapor (i.e., gas) in processes of the invention enables new reactor configurations that are simpler, as well as providing integrated synthesis and purification processes.

Figure 1:
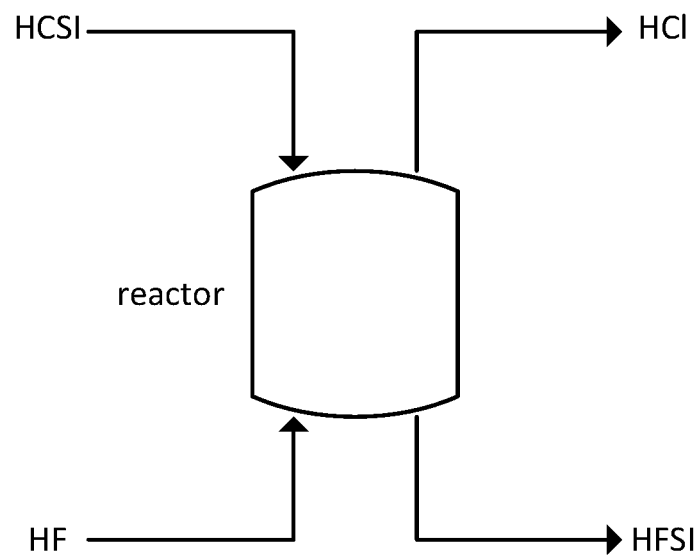
FIG. 1 is a schematic illustration of one embodiment of the invention showing a process for continuous fluorination of HCSI to HFSI.

One aspect of the invention provides a counter flow reactor apparatus for producing HFSI. This process for converting HCSI to HFSI is schematically illustrated in FIG. 1 where a liquid HCSI is contacted with a gaseous HF to produce gaseous HFSI and gaseous HCl. As HCSI and HFSI are liquids above 37° C. and 17° C., respectively, a convenient approach is to perform the reaction in a counter flow geometry where HCSI is fed at the top of a reactor column and HF vapor is fed at the bottom. It should be appreciated that the reaction apparatus need not be vertically oriented, but can be at an angle as long as liquid HCSI can flow towards the HF that is added and vice versa. The reactor column can be filled with a random or structured packing or configured with stages such as sieve plates or trays as typically used in mass transfer equipment to enhance vapor-liquid contact and exchange of chemical species. As HF rises through the column counter to the falling HCSI, the reaction takes place and gaseous HCl that is produced exits at the top of the column reactor and the liquid HFSI product exits from the bottom. This geometry has the advantage that HCl product is stripped from the HFSI product by HF vapor. Thus the product HFSI at the point of highest conversion is in contact with the highest concentration of HF, which helps drive the reaction to completion. Counter flow operation (e.g., allowing flow of HCSI and HF to be in opposite directions to allow admixing the reactants) also minimizes the loss of HF from the reactor as HCSI entering the top of the column reactor consumes small amounts of HF rising through the column. At least 2 moles of HF is fed per mole of HCSI and an excess of HF can be helpful in achieving high conversion, i.e., HFSI production. Reaction rates can be accelerated at higher temperatures. As the temperature increases, the vapor pressure of HFSI (b.p. 170° C.) may increase to the point that significant quantity of HFSI exits the reactor at the top port with the HCl exhaust. The loss of HFSI vapor can be reduced by increasing reactor pressure. Higher reactor pressure will also increase the liquid phase concentration of HF throughout the column; however, this higher reaction pressure has the disadvantage of possibly preventing some HF from reacting with HCSI and instead ending up in the liquid HFSI product. With additional complexity, the excess HF in the HFSI product can be separated by distillation or stripping and recovered for reuse in the fluorination of HCSI.

Figure 2:
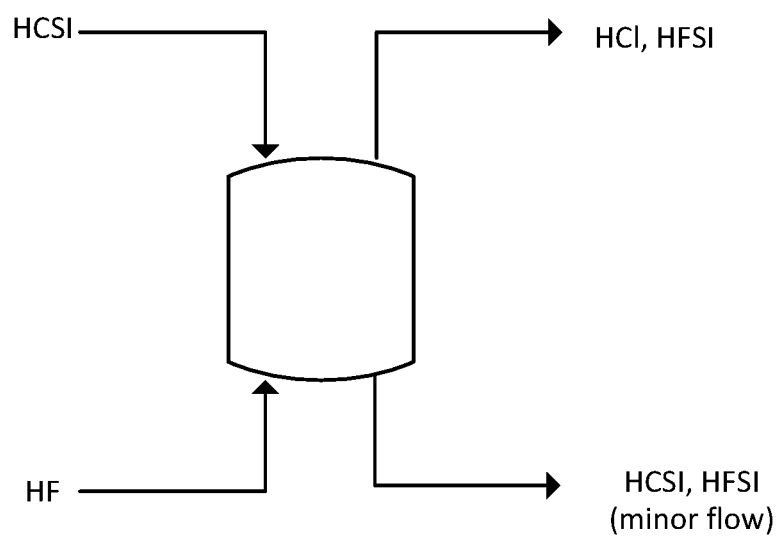
FIG. 2 is a schematic illustration of another embodiment of the process of the invention showing a continuous fluorination of HCSI to HFSI with HFSI product in the vapor exhaust.

Another embodiment of the invention includes counter flow process with HFSI vapor recovery. FIG. 2 is a schematic illustration of a continuous counter flow process where HFSI product exits the reactor as the vapor stream at the top of the reactor. This reactor can be configured also as a vertical column with packing or stages. Allowing HFSI vapor to exit the top of the reactor column is not problematic if the fluorination reaction is not reversible under the operating conditions. The present inventors have discovered that unexpectedly under the processes of the invention, the reaction appears to not be reversible. The product HFSI can be condensed (and separated) from the HCl gas in the exit vapor stream with good HFSI yield.

Figure 3:
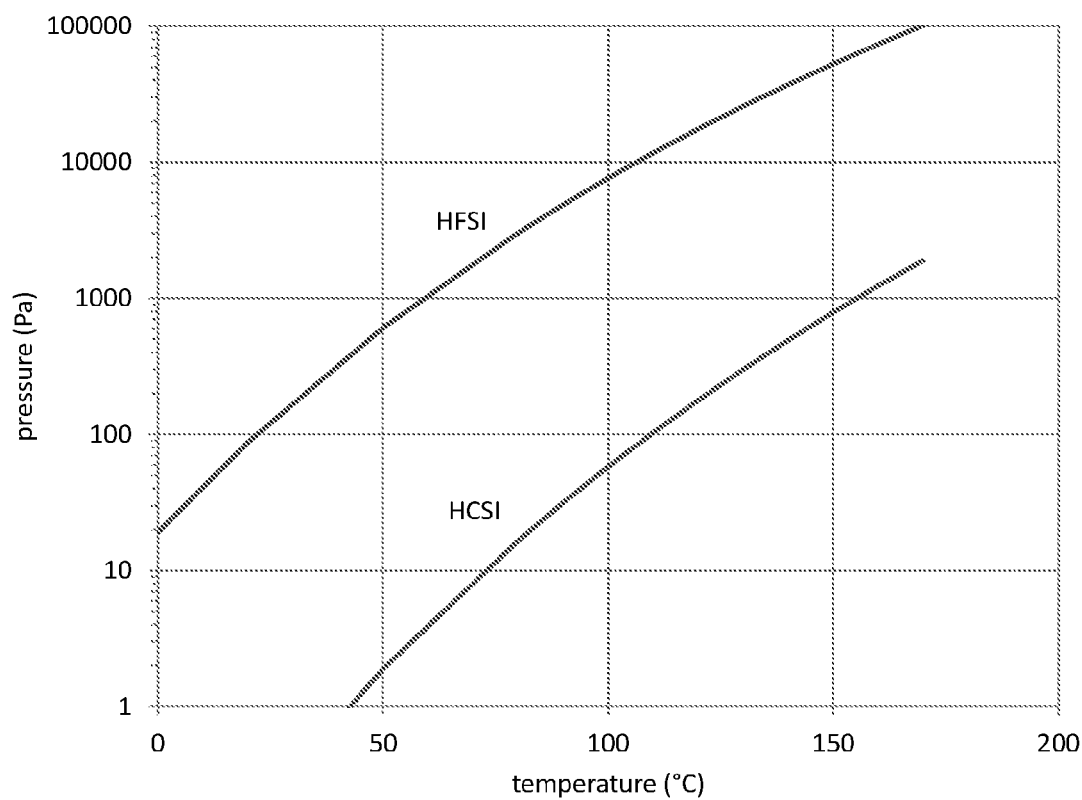
FIG. 3 is vapor pressure curves at various temperatures for pure HFSI and HCSI as fit to the Antoine equation using boiling point measurements at various pressures.
Figure 4:
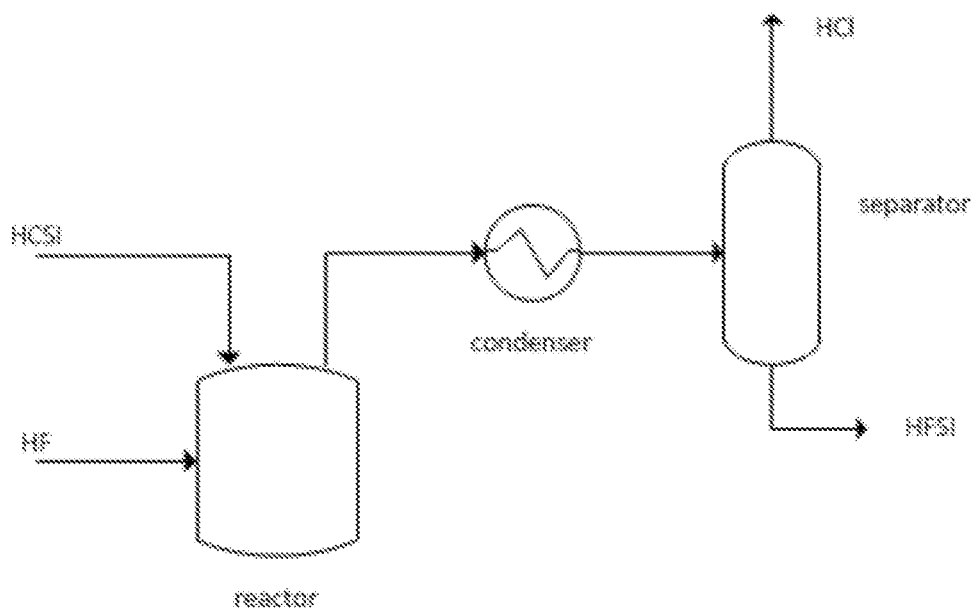
FIG. 4 is a schematic illustration of one particular method and apparatus of the invention for a continuous HFSI production process.

Vapor pressure curves for HFSI and HCSI are shown in FIG. 3 as fit to the Antoine equation using boiling point measurements at various pressures. HFSI has a normal boiling point (i.e., at 1 atmospheric pressure) of 170° C., and the partial (i.e., vapor) pressure of HFSI remains significant at ambient pressures down to about 110° C. The vapor pressure of HCSI is almost two orders of magnitude lower than that of HFSI. In some embodiments of the present invention, both HFSI and HCl are removed selectively from the reaction medium as a vapor. One particular embodiment of the general reaction system is illustrated in FIG. 4 where HCSI and HF are fed to a reactor (i.e., apparatus). As HF is consumed in the reactor, HFSI and HCl are generated. FIG. 4 shows a condenser where HFSI is condensed as a liquid and is separated using a phase separator. In this process, HCl gas is removed from the liquid HFSI product. This separator can also include an inert gas feed or vacuum in order to strip (i.e., remove) residual dissolved HCl and other volatiles from the HFSI product.

The reactor in FIG. 4 can also advantageously include a column reactor described above. This approach has the advantage that HF vapor is used efficiently in the reaction and its escape from the reactor is minimized by the counter flow of the HCSI reactant. Unreacted HCSI and heavy degradation products over long production periods, if present, could be removed from the bottom of the reactor to maintain operation.

Figure 5:
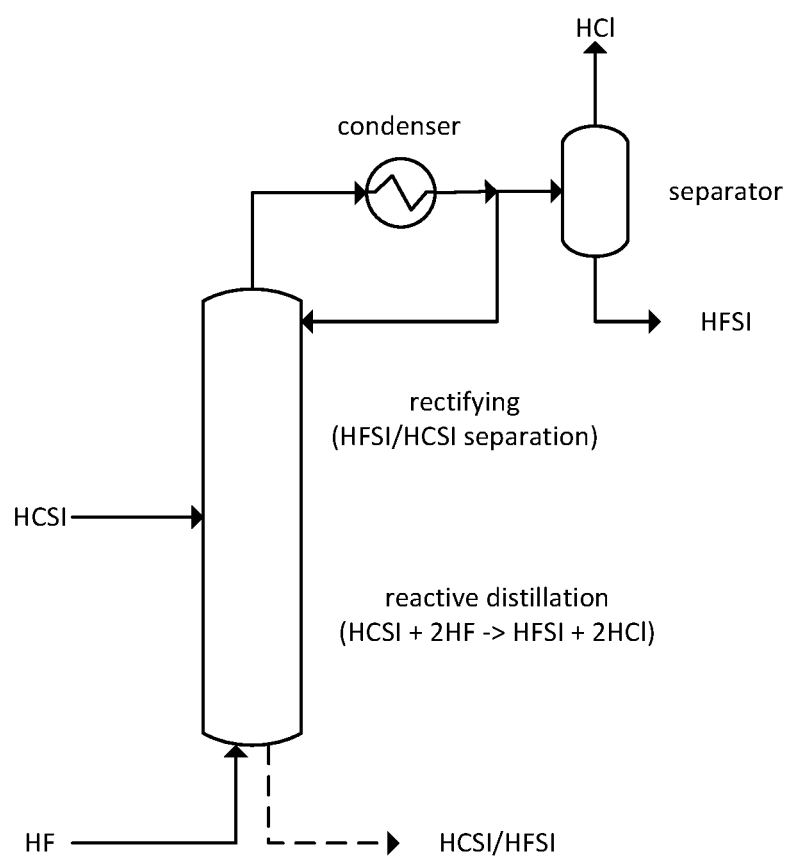
FIG. 5 is a schematic illustration of another embodiment of the method and apparatus of the invention for a continuous HFSI fluorination process with HFSI rectification.

A further improvement to the process can utilize a rectifying column above the reaction column to reduce the loss of HCSI in the HFSI product as shown in FIG. 5. Small amounts of HCSI in the HFSI product may results in chloride contamination if high purity HFSI is desired. The rectifying section includes a condenser with reflux and collection of the liquid HFSI and separation of HCl as described above. Also shown in FIG. 5 is the possibility of a liquid byproduct that may be the result of low conversion or of unconverted HCSI and degradation products over long production periods. An optional purge at the bottom of the column can be used to facilitate removal of these undesired materials, if necessary.

Figure 6:
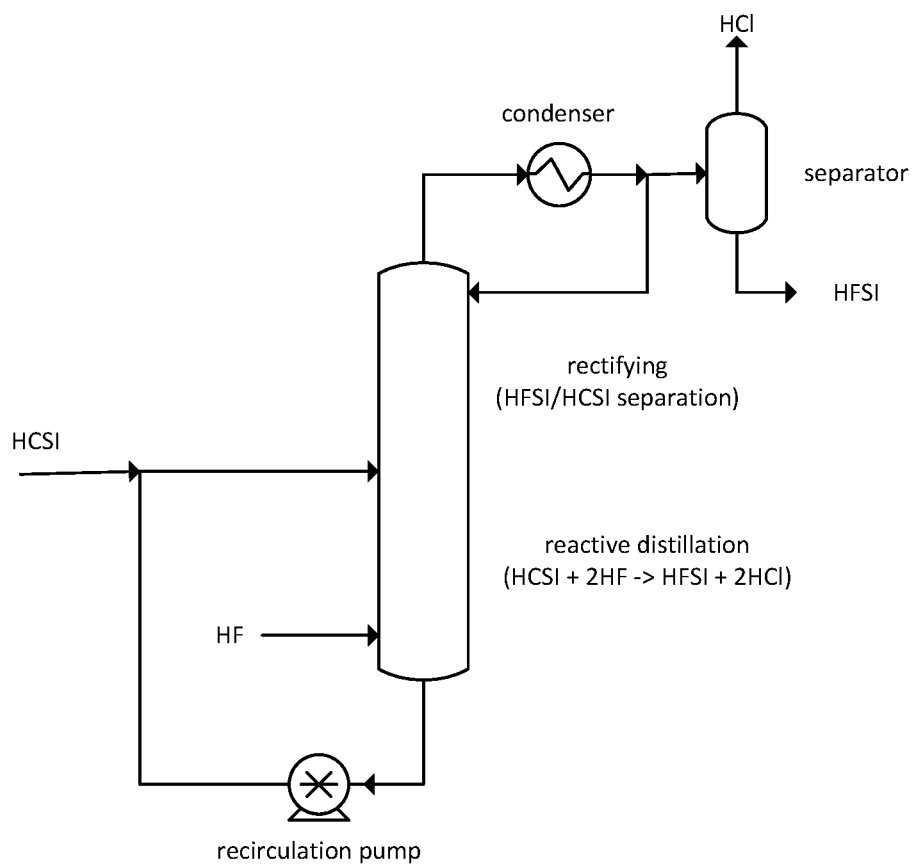
FIG. 6 is a schematic illustration of yet another embodiment of the method and apparatus of the invention for a continuous HFSI fluorination process with HCSI recirculation.

FIG. 6 shows another embodiment of the process of the invention. In this embodiment, the continuous fluorination reactor is shown with a recirculation loop in the reactive distillation section of the system. This recirculation loop can allow operation of the reaction section at a much higher overall concentration of HCSI. Kinetics may be enhanced in this mode of operation. Utilization of HF is also enhanced in this embodiment as the reactant HCSI is in higher concentration. Selective removal of the HFSI product by the rectifying section ensures that high purity product is recovered. Another advantage of this arrangement is that a catalyst may be included in the recirculation loop. For example, chloride and fluoride salts of Bi(III), Sb(III), and As(III) were disclosed as effective fluorinating catalysts in U.S. Pat. No. 8,722,005, which is incorporated herein by reference in its entirety. If the catalyst has low vapor pressure, its availability in the reactor can be maintained for long term operation. Yet another advantage of the recirculation loop reactor is that an in-line heater placed after the recirculation pump can be used to add heat to the reaction system. Adding heat in this manner can be particularly helpful if the fluorination is endothermic and a radial temperature gradient in a large reactor column reduces reactor performance.

Figure 7:
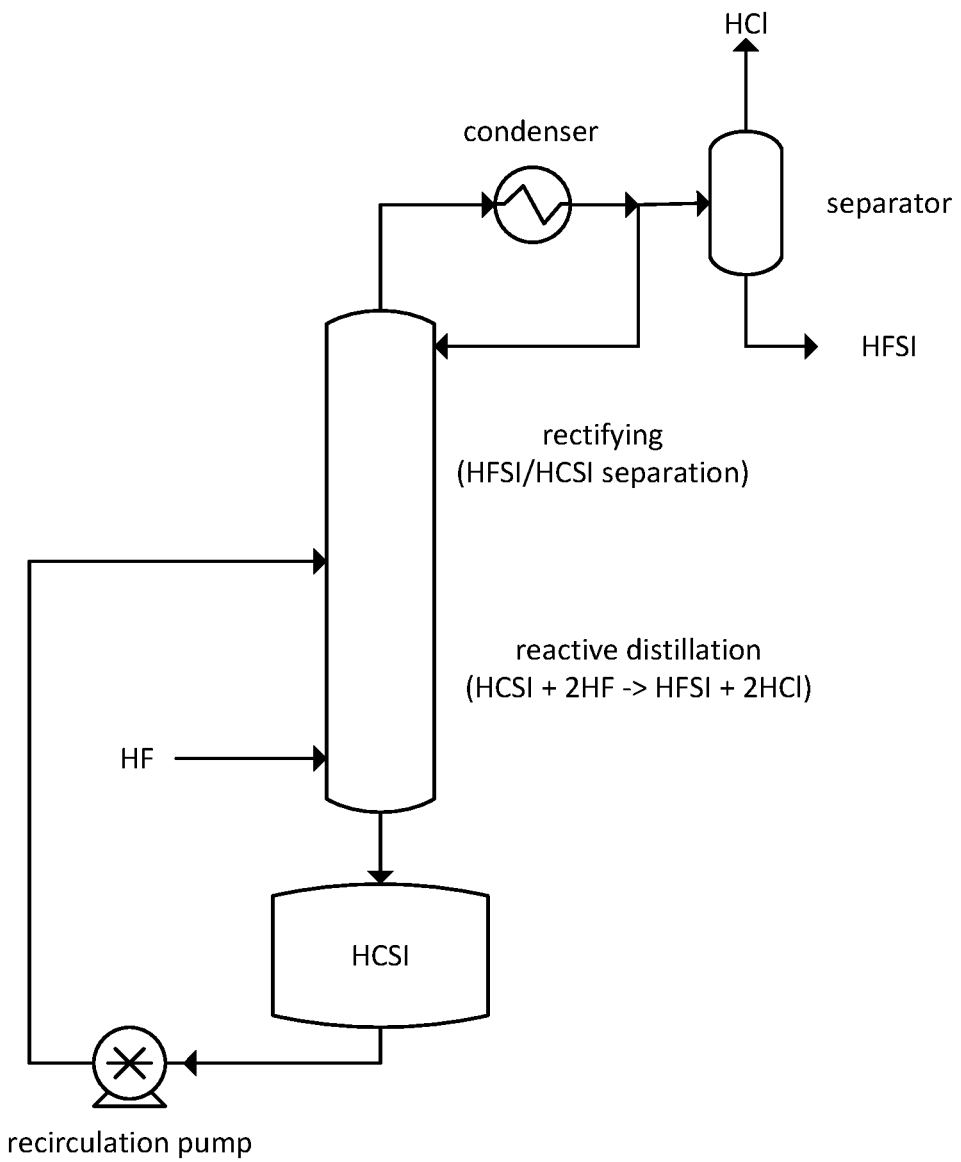
FIG. 7 is a schematic illustration of still another embodiment of the method and apparatus of the invention for a continuous process for producing HFSI with a more detailed illustration of HCSI recirculation.

The inclusion of a HCSI reservoir below the reactive distillation column in the recirculation loop reactor system enables semi-batch fluorination as shown in FIG. 7. In this system, a batch of HCSI could be charged into the reservoir and fluorination of HCSI takes place as the HCSI is recirculated and HF is added to the reactor until all of the HCSI is converted to HFSI.

Another aspect of the invention provides a process for producing HFSI by admixing a liquid HCSI and a gaseous hydrogen fluoride. The reaction conditions are maintained such that the HFSI produced is removed from the reaction mixture as a gas. The collected gas comprising HFSI is condensed to produce a liquid HFSI while allowing other gaseous products, such as HCl, are allowed to remain as gas, thereby providing ease of purification of HFSI.

The embodiments described allow direct conversion of HCSI to HFSI with anhydrous HF in an approach that enables continuous fluorination with good yield and efficient use of the HF feedstock in a single pass, thus avoiding the need to recover and recycle HF in the reactor exit stream. The methods described use a counter flow of HCSI and HF. While a packed-bed gravity-driven geometry is described, other methods of establishing counter flow may also be employed including but not limited to series continuous stirred tank reactors (CSTR) with the HF and vapor stream configured counter flow to the HCSI stream.

The yield of HFSI using the process of the invention is at least about 75% (based on conversion of HCSI), typically at least about 90%, and often at about least 95%. Throughout this disclosure, the term "about" when referring to a numeric values means ±20%, typically ±10%, and often ±5% of the numeric value.

One specific aspect of the invention provides a process for producing hydrogen bis(fluorosulfonyl)imide (HFSI). Such a process includes: adding a liquid hydrogen bis(chlorosulfonyl)imide (HCSI) and a gaseous hydrogen fluoride to a reaction apparatus under conditions sufficient to produce gaseous HFSI; and removing said gaseous HFSI from the reaction apparatus. In some embodiments, liquid HCSI is added in counter current direction relative to gaseous hydrogen fluoride.

In other embodiments, the process further comprises the step of separating gaseous HFSI from hydrogen chloride byproduct, for example, by condensing gaseous HFSI to liquid HFSI. Yet in other embodiments, at least a portion of unreacted HCSI is in the liquid phase, and the majority of the HFSI is in a vapor phase. As used herein, the term "majority" means more than 50%, typically at least about 60%, often at least about 75% and more often at least about 80%. Still in other embodiments, the reaction condition comprises temperature and pressure that is below the vapor pressure curve of HFSI but above the vapor pressure curve of HCSI shown in FIG. 3.

Yet still in another embodiment, the process further comprises the step of recovering at least a portion of the unreacted HCSI. In such embodiments, liquid HCSI that is used in the reaction comprises at least a portion of the recovered HCSI, i.e., unreacted HCSI is recycled. In another embodiment, the reaction apparatus comprises a series of a plurality of reaction chambers, where each of the reaction chambers comprises a reactor for producing HFSI from liquid HCSI and gaseous hydrogen fluoride; and a HFSI condenser for collecting gaseous HFSI that is produced from each reactor. Still in another embodiment, the process further comprises condensing gaseous HFSI to produce a liquid HFSI. In such embodiments, byproduct HCl can be separated from the liquid HFSI.

Another aspect of the invention provides a process for producing a liquid hydrogen bis(fluorosulfonyl)imide (HFSI). In this particular aspect of the invention, the process comprises adding a liquid hydrogen bis(chlorosulfonyl)imide (HCSI) and a gaseous hydrogen fluoride to a reaction apparatus under conditions sufficient to produce gaseous HFSI, wherein said liquid HCSI is added counterflow (or counter current direction) to said gaseous hydrogen fluoride; removing said gaseous HFSI from the reaction apparatus; and condensing said gaseous HFSI to produce a liquid HFSI. In some embodiments, the reaction condition comprises temperature and pressure conditions such that it is below the vapor pressure curve of HFSI but above the vapor pressure curve of HCSI. See FIG. 3. In other embodiments, the process is a continuous process. Still in other embodiments, the stoichiometric ratio of addition of said gaseous hydrogen fluoride to said liquid HCSI is at least about 2:1, typically at least about 3:1, often at least 4:1 and more often at least about 5:1.

Yet in other embodiments, gaseous HFSI that is produced is continuously removed from the reaction apparatus. In some instances, gaseous HFSI that is removed from the reaction apparatus comprises unreacted HCSI. In many cases, the unreacted HCSI is recovered and added to the reaction apparatus, i.e., it is recycled.

Still another aspect of the invention provides a process for producing hydrogen bis(fluorosulfonyl)imide (HFSI), where such a process comprises adding a liquid hydrogen bis(chlorosulfonyl)imide (HCSI) and a gaseous hydrogen fluoride to a reaction apparatus under reaction temperature and pressure conditions to produce a mixture of gaseous HFSI and gaseous hydrogen chloride; and removing said mixture of gaseous HFSI and gaseous hydrogen chloride from the reaction apparatus. In some embodiments, the majority of unreacted HCSI remains as a liquid. Yet in other embodiments, the mixture of gaseous HFSI and gaseous hydrogen chloride is removed continuously from the reaction apparatus.

Still in other embodiments, the process further comprises the step of separating gaseous hydrogen chloride from the mixture to produce a purified HFSI. In some instances, the step of separating gaseous hydrogen chloride from the mixture comprises condensing a gaseous HFSI to produce a liquid HFSI and separating a gaseous hydrogen chloride from the liquid HFSI.

Yet in other embodiments, the liquid HCSI is added in a counterflow direction to said gaseous hydrogen fluoride. In another embodiment, the process is a continuous process. Still in other embodiments, the stoichiometric ratio of addition of said gaseous hydrogen fluoride to said liquid HCSI is at least about 2:1, typically at least about 3:1, often at least about 4:1 and more often at least about 5:1. Yet still in another embodiment, the gaseous HFSI that is removed from the reaction apparatus comprises unreacted HCSI. In some cases within such an embodiment, the unreacted HCSI is separated from said HFSI and added to the reaction apparatus, i.e., recycled. HFSI can be separated from HCSI by utilizing differences in the boiling points of HFSI and HCSI.

Additional objects, advantages, and novel features of this invention will become apparent to those skilled in the art upon examination of the following examples thereof, which are not intended to be limiting. In the Examples, procedures that are constructively reduced to practice are described in the present tense, and procedures that have been carried out in the laboratory are set forth in the past tense.

EXAMPLES

Example 1

A 61 cm long, 17.3 mm inner diameter (ID) vertical stainless steel tube packed with 0.16 inch Cannon Pro-Pak® distillation packing was used as a counter flow reactor as shown in FIG. 2. A reservoir was attached at the bottom to collect any liquid product exiting the bottom of the reactor column and where vaporized HF was fed at a controlled rate. HCSI liquid was fed into the top of the reactor column. The reactor was heated with electrical heating tape along the entire length, and the heater power was adjusted using PI closed loop control the reactor column outer wall temperature at nominally 175° C. Vapor was allowed to exit the top of the reactor and into a liquid collection vessel. A total of 82.2 g of HCSI was fed through the reactor over the course of about half an hour. Liquid droplets were observed in the top outlet line of the reactor, however it was observed that this liquid was condensation of vapor rather than liquid directly leaving the reactor. 58.1 g of liquid was collected from the liquid collection vessel after the reactor, and ion chromatography showed this material to be 76 wt % HFSI for a HCSI to HFSI conversion of 64%. No liquid was collected from the reservoir below the reactor.

Example 2

The reactor from Example 1 was modified to include a condenser cooled with water on the reactor vapor outlet to fully condense HFSI to be collected in a liquid collection vessel. The reactor was heated to around 110° C. for this experiment. A total of eighty-eight grams of HCSI was fed with an excess of HF. At the end of the experiment, 26.6 g of condensed liquid, which was shown by ion chromatography to be 72 wt % HFSI, was collected. After the experiment, 57.7 g of liquid was collected in the bottom catch vessel below the reactor and was 3 wt % HFSI. Conversion of HCSI to HFSI in the vapor outlet was 26%.

Example 3

The reactor was rebuilt such that HCSI feed was introduced into middle of the 61 cm column, as depicted in FIG. 5. The lower half of the reactor was heated with an electric heat tape such that the outer wall of the reactor was 165° C. at 15 cm above the bottom of the packing, and the upper half was insulated such that it would operate as a rectifying section. HF was introduced into the bottom of the reactor at a stoichiometric flow ratio of HF to HCSI of about 4:1. During the experiment, 299.5 g of HCSI was fed, and 176.7 g of liquid was collected in the liquid collection vessel after the reactor outlet and condenser. This liquid contained very low chloride levels of 441 ppm$_w$ but high sulfate and fluorosulfate levels of 16,700 ppm$_w$ and 18,217 ppm$_w$, respectively. The high sulfate and fluorosulfate levels were believed to be from unwanted side reactions which caused runaway thermal events at the bottom portion of the reactor. These events were observed when poorly controlled HCSI flow dropped and an excess of HF was present in the bottom of the reactor. After the experiment, 38.1 g of liquid was removed from the reservoir below the reactor.

The same reactor was operated again. In this second run, chloride levels were low again, at 707 ppm$_w$ and 719 ppm$_w$ for two samples taken. The low chloride levels suggest that the rectifying section was successfully separating HCSI vapor from the reactor vapor outlet and sending it back into the reactor to be fluorinated.

Example 4

The system described in Example 2 was used. Temperature control was switched to a constant wattage instead of PID control of one measured temperature. HF flow was set such that the stoichiometric ratio of HF to HCSI was about 2:1. Much steadier temperatures were obtained during steady state collection periods because of these changes, and temperatures varied between 130° C. and 190° C. along the length of the column. Total power to the reactor was increased such that the temperature profile of the reactor was similar between runs with higher flow rates. Results for ion chromatography analysis and conversion of HCSI to HFSI for these experiments can be found in Table 1. The mass that was collected showed yield was greater than 70%.

TABLE 1

Ion chromatography results.

| HCSI Flow (g/min) | HFSI (ppm$_w$) | Chloride (ppm$_w$) | Sulfate (ppm$_w$) | Fluorosulfate (ppm$_w$) | Conversion HCSI to HFSI |
|---|---|---|---|---|---|
| 2.2 | 772,888 | 29,104 | 1,411 | 5,723 | 58.0% |
| 4.7 | 770,477 | 53,094 | 14,974 | 3,296 | 82.4% |
| 5.8 | 748,702 | 80,618 | 33,178 | 14,697 | 80.1% |
| 7.7 | 819,000 | 56,572 | 8,581 | 13,887 | 79.2% |
| 13.8 | 769,058 | 65,447 | 7,620 | 13,765 | >70% |

The foregoing discussion of the invention has been presented for purposes of illustration and description. The foregoing is not intended to limit the invention to the form or forms disclosed herein. Although the description of the invention has included description of one or more embodiments and certain variations and modifications, other variations and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter. All references cited herein are incorporated by reference in their entirety.

What is claimed is:

1. A process for producing hydrogen bis(fluorosulfonyl) imide (HFSI), said process comprising:
   adding a liquid hydrogen bis(chlorosulfonyl)imide (HCSI) and a gaseous hydrogen fluoride to a reaction apparatus under conditions sufficient to produce gaseous HFSI; and
   removing said gaseous HFSI from the reaction apparatus.

2. The process of claim 1, wherein said liquid HCSI is added counter current relative to said gaseous hydrogen fluoride.

3. The process of claim 1 further comprising the step of separating gaseous HFSI from hydrogen chloride byproduct.

4. The process of claim 1, wherein at least a portion of said HCSI is in the liquid phase, and the majority of the HFSI is in a vapor phase.

5. The process of claim 1, wherein said reaction condition comprises temperature and pressure conditions that are below the vapor pressure of HFSI but above the vapor pressure of HCSI shown in FIG. 3.

6. The process of claim 1 further comprising the step of recovering at least a portion of the unreacted HCSI.

7. The process of claim 6, wherein said liquid HCSI comprises at least a portion of said recovered unreacted HCSI.

8. The process of claim 1, wherein said reaction apparatus comprises a series of a plurality of reaction chambers, and wherein each of said reaction chambers comprises a reactor for producing HFSI from HCSI and hydrogen fluoride; and a HFSI condenser for collecting said gaseous HFSI produced from each reactor.

9. The process of claim 1, wherein said process further comprises condensing said gaseous HFSI to produce a liquid HFSI.

10. A process for producing a liquid hydrogen bis(fluorosulfonyl)imide (HFSI), said process comprising:
    adding a liquid hydrogen bis(chlorosulfonyl)imide (HCSI) and a gaseous hydrogen fluoride to a reaction apparatus under conditions sufficient to produce gaseous HFSI, wherein said liquid HCSI is added counterflow to said gaseous hydrogen fluoride;
    removing said gaseous HFSI from the reaction apparatus; and
    condensing said gaseous HFSI to produce a liquid HFSI.

11. The process of claim 10, wherein said reaction condition comprises temperature and pressure conditions such that it is below the vapor pressure of HFSI but above the vapor pressure of HCSI.

12. The process of claim 10, wherein said process is a continuous process.

13. The process of claim 10, wherein the rate of addition of said gaseous hydrogen fluoride to said liquid HCSI is at least about 2:1.

14. The process of claim 10, wherein said gaseous HFSI is continuously removed from the reaction apparatus.

15. The process of claim 14, wherein gaseous HFSI that is removed from the reaction apparatus comprises unreacted HCSI.

16. The process of claim 15, wherein said unreacted HCSI is recovered and added to the reaction apparatus.

17. A process for producing hydrogen bis(fluorosulfonyl) imide (HFSI), said process comprising:
    adding a liquid hydrogen bis(chlorosulfonyl)imide (HCSI) and a gaseous hydrogen fluoride to a reaction apparatus under reaction temperature and pressure conditions to produce a mixture of gaseous HFSI and gaseous hydrogen chloride; and
    removing said mixture of gaseous HFSI and gaseous hydrogen chloride from the reaction apparatus.

18. The process of claim 17, wherein the majority of unreacted HCSI remains as a liquid.

19. The process of claim 17, wherein said mixture of gaseous HFSI and gaseous hydrogen chloride is removed continuously from the reaction apparatus.

20. The process of claim 17 further comprising the step of separating said gaseous hydrogen chloride from said mixture to produce a purified HFSI.

21. The process of claim 20, wherein said step of separating said gaseous hydrogen chloride from said mixture comprises the step of condensing said gaseous HFSI to produce a liquid HFSI and separating said gaseous hydrogen chloride from said liquid HFSI.

22. The process of claim 17, wherein said liquid HCSI is added in a counterflow direction to said gaseous hydrogen fluoride.

23. The process of claim 17, wherein said process is a continuous process.

24. The process of claim 17, wherein the stoichiometric ratio of addition of said gaseous hydrogen fluoride to said liquid HCSI is at least about 2:1.

* * * * *